(12) United States Patent
Basett

(10) Patent No.: US 8,028,435 B2
(45) Date of Patent: Oct. 4, 2011

(54) CUTTING TOOL ADJUSTMENT SYSTEM

(75) Inventor: Roger Basett, Cornwall (GB)

(73) Assignee: Rigibore Limited (GB)

( * ) Notice: Subject to any disclaimer, the term of this patent is extended or adjusted under 35 U.S.C. 154(b) by 569 days.

(21) Appl. No.: 10/597,782

(22) PCT Filed: Sep. 6, 2005

(86) PCT No.: PCT/GB2005/002272
§ 371 (c)(1),
(2), (4) Date: Aug. 8, 2006

(87) PCT Pub. No.: WO2006/000746
PCT Pub. Date: Jan. 5, 2006

(65) Prior Publication Data
US 2007/0297866 A1      Dec. 27, 2007

(30) Foreign Application Priority Data

Jun. 23, 2004  (GB) .................................. 0413986.1

(51) Int. Cl.
*B23Q 17/22*         (2006.01)
(52) U.S. Cl. ................. 33/637; 82/59; 408/116; 408/16; 33/636
(58) Field of Classification Search ............ 33/626–628, 33/630, 633–641, 833, 836, 838, 542.1, 501.08; 407/36; 82/1.11, 59, 60, 118; 408/16, 116; 83/522.15, 522.24, 955
See application file for complete search history.

(56) References Cited

U.S. PATENT DOCUMENTS

| | | | | |
|---|---|---|---|---|
| 4,662,075 A * | 5/1987 | Mastel et al. | | 33/628 |
| 5,000,627 A * | 3/1991 | York | | 408/16 |
| 5,036,596 A * | 8/1991 | Gyoury et al. | | 33/636 |
| 5,251,511 A * | 10/1993 | Muendlein et al. | | 82/1.2 |
| 5,447,517 A | 9/1995 | Steen et al. | | |
| 5,657,550 A * | 8/1997 | Struble | | 33/548 |
| 6,422,012 B1 * | 7/2002 | Bassett | | 60/528 |
| 6,434,852 B1 * | 8/2002 | Tarris et al. | | 33/640 |
| 6,978,552 B1 * | 12/2005 | Sluder | | 33/640 |
| 7,469,484 B2 * | 12/2008 | Marquart | | 33/550 |
| 2001/0020336 A1 * | 9/2001 | Tadaki | | 33/833 |
| 2004/0040169 A1 * | 3/2004 | Davis | | 33/640 |
| 2009/0214303 A1 * | 8/2009 | Haimer | | 407/36 |

FOREIGN PATENT DOCUMENTS

| | | |
|---|---|---|
| DE | 3702268 | 8/1988 |
| DE | 3916759 | 12/1989 |

* cited by examiner

*Primary Examiner* — Amy Johnson
(74) *Attorney, Agent, or Firm* — Levenfeld Pearlstein, LLC

(57) ABSTRACT

A cutting tool adjustment system comprising a body in the form of a cartridge (10) adjustably carrying a cutting tool (10a), adjustment means (17; 23; 29; 39) mechanically adjustably engageable with the body for positionally adjusting a cutting edge of the cutting tool (10a), and means (19, 20; 30, 31; 34, 35) electronically engageable with the body aid including power supply means for powering display means (21; 28; 36) for indicating the adjustment of the cutting edge position.

34 Claims, 1 Drawing Sheet

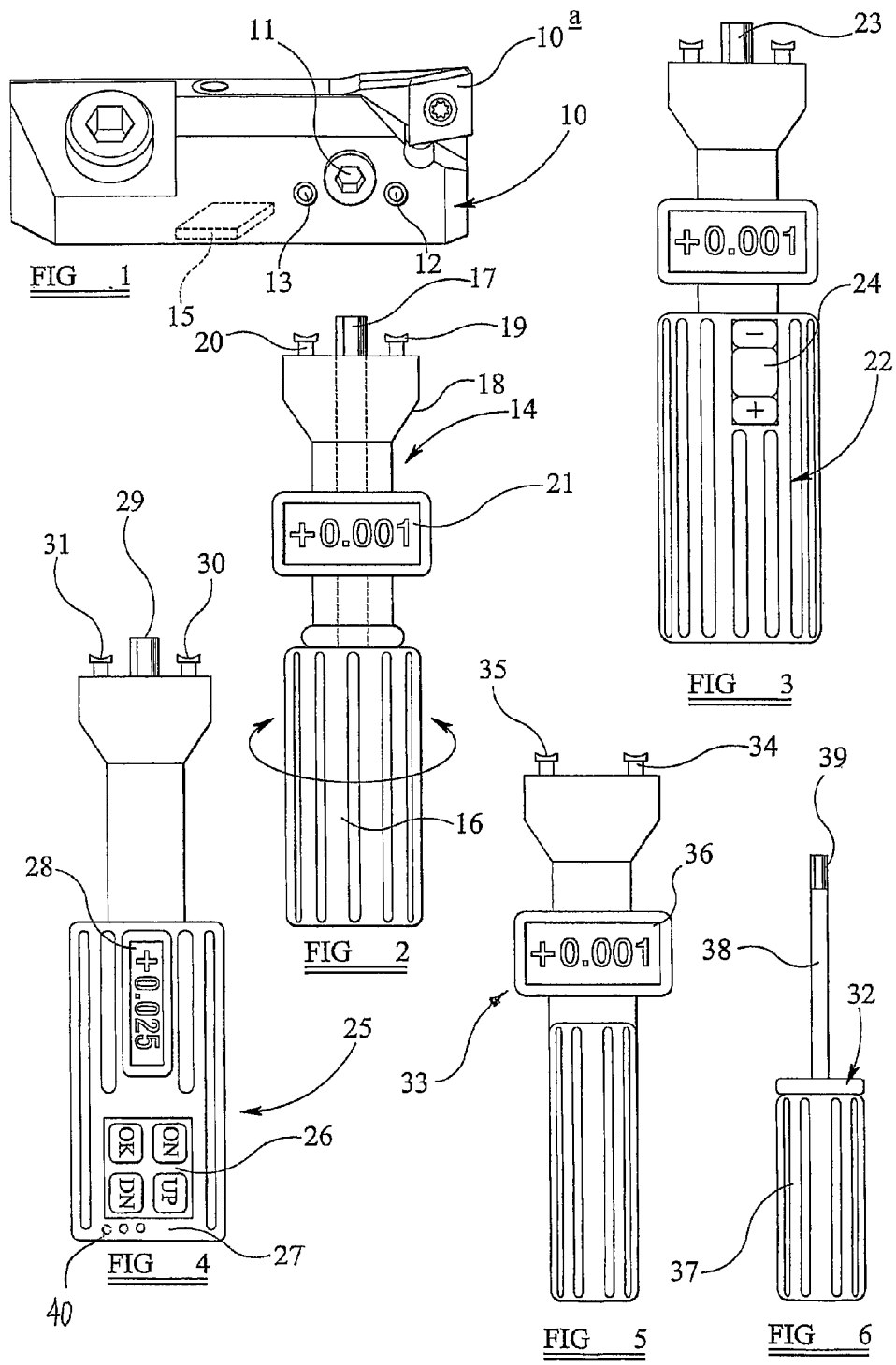

CUTTING TOOL ADJUSTMENT SYSTEM

This invention relates to a cutting tool adjustment system, and has particular application to the adjustment of the cutting edges of metal cutting tools, especially boring and reaming tools.

The use of a boring bar assembly, more commonly known as a boring bar, is known for producing a series of concentric holes in a component to very accurate dimensions and in one machining operation. The boring bar may comprise any number or combination of adjustable cartridges and adjustable boring units, more commonly called bush units. Each cartridge or bush unit comprises a single, replaceable carbide insert, and a mechanism for adjusting the position of the cutting edge of the insert. Prior to being used, all of the cartridges or bush units on the tool are manually adjusted or set, so that the cutting edges produce the correct hole size when in use.

Eventually these cutting edges wear, resulting in incorrectly sized holes being produced. At this point the manufacturing process must be stopped so that the cartridges/bush units can be adjusted to compensate for the wear. Fine graduations on the adjustment mechanisms of both the cartridge and the bush unit can be difficult to see clearly inside a CNC machine, as the environment therein is often badly lit, with the tool being covered with metal swarf and coolant. Of course during the adjustment procedure the CNC machine is stopped, so the above difficulties are exacerbated by the need to perform the compensating adjustments as quickly as possible, so that production can continue. Typically it may take as long as fifteen minutes to adjust all the cutting edges. Such delays can result in significant and expensive production losses.

Reaming tools are used to create both a high finish in addition to an accurately sized hole. For both economy and flexibility many reamers now have replaceable carbide blades. In order to maintain a correctly sized hole, these blades have to be set extremely precisely. To achieve this the tool must be removed from the CNC machine and placed into an expensive, and somewhat complicated, setting fixture.

An object of the invention is to provide such a tool adjuster system in a convenient and effective manner, so as at least to reduce the above mentioned problems.

According to the present invention there is provided a cutting tool adjustment system comprising a body for adjustably holding a cutting tool, adjustment means mechanically releasably engagable with the body for positionally adjusting a cutting edge of the cutting tool, and means electronically releasably engagable with the body and including power supply means for at least powering means providing information as to adjustment made, in use, to said cutting edge position by said adjustment means.

Preferably the means electronically engagable with the body includes an electronic display, for example a liquid crystal display (LCD), constituting said means providing information as to said adjustment. In one embodiment the LCD shows the adjustment as the adjustment means is operated. In another embodiment the LCD shows a pre-programmed amount of adjustment. With the adjustment means being motor driven, the pre-programmed amount of adjustment is effected automatically upon engagement of the electronically engagable means with the body. With the adjustment means being manually operated, LEDs turn on or off to indicate when said pre-programmed amount of adjustment has been effected.

In a convenient embodiment, the adjustment means is fitted to the means electronically engagable with the body to define an adjuster tool. When the adjuster tool is engaged with the body, operation of said adjustment means turns an adjusting screw controlling the position of the cutting tool edge. When the adjuster tool is engaged with the body, there is at least one electrical contact therebetween. The adjuster tool includes said power supply means, such as a battery, which by way of said at least one electrical contact supplies power to the body. The body advantageously contains electronic circuitry which regulates and applies an output from an electronic position sensor monitoring the position of said cutting tool edge. A signal voltage dependent on the amount of adjustment of the cutting tool edge is generated and passes to the adjuster tool. This voltage may be proportional to the amount of adjustment, i.e. linear, or the relationship may not be proportional, i.e. it may be non-linear, but known. Conveniently the power from the adjuster tool is passed via one electrical input contact to the electronic circuitry on the body, whilst said output signal voltage is made available at a second electrical contact between the body and the adjuster tool. The body can act as a common ground/earth connection, and this can be used for both the power input and the signal output. Alternatively the ground/earth could be a specific contact on the body.

Desirably the signal voltage is processed by an electronic circuit located in the adjuster tool, preferably in a handle of the adjustment means. As a result, the distance equivalent of the signal voltage is displayed on an LCD screen on the means electronically engagable with the body, so that an operator can monitor the adjustment process. Once the required adjustment has been made, the adjuster tool is disengaged from the body, breaking the electrical connection and switching it off. The position signal voltage output location can be the same for all bodies, thereby enabling the adjuster tool to be used for all similarly constructed bodies.

The adjustment means can be manually operable or motor driven. In the latter case, the adjuster tool has a rocker switch for 'up/down' adjustment of the cutting tool edge.

In an alternative embodiment the mechanical and electronic functions of the adjuster tool are split, so that the adjustment means is separate from, and thus not fitted to, the means electronically engagable with the body. The battery and electronics are contained in a handle of the means electronically engagable with the body, which thus becomes a position reader. This arrangement provides greater flexibility as to where the electrical contacts could be placed on the body.

The invention will now be described, by way of example, with reference to the accompanying drawings, in which:

FIG. 1 is a front view of a cutting tool holding body of a cutting tool adjustment system of the invention, FIG. 2 is a plan view of an adjuster tool of the system of the invention, for use with the body of FIG. 1, FIG. 3 is a plan view of another embodiment of an adjuster tool of a system of the invention, FIG. 4 is a plan view of a further embodiment of an adjuster tool of a system of the invention, FIG. 5 is a plan view of a read-out device of a still further embodiment of a system of the invention, and FIG. 6 is a plan view of an adjustment tool of said still further embodiment of a system of the invention.

The invention described below relates to a cutting tool adjustment system which, as a vendable product, is designed to reduce the time taken to make precise adjustments to the cutting edges of metal cutting tools, especially boring and reaming tools, and to reduce the risk of error. In various specific embodiments, this reduction in the risk of error is effected by providing the operator with an easy to read, numerical display.

A first embodiment of the invention will be described in relation to FIGS. 1 and 2. FIG. 1 shows a metal body in the form of an adjustable cartridge 10 which, in use, adjustably carries a cutting tool 10a, such as a carbide tool. The cartridge 10 is, for example carried by a boring bar. The tool can be mounted to the cartridge 10 in any convenient manner, for example by way of a separate tool holder or otherwise. The main point to be noted is that the cutting tool is mounted so that the position of a cutting edge thereof can be adjusted. To this end, the cartridge 10 is provided with an internal adjusting screw 11 which, when turned, will adjust the position of the cutting tool edge. As can be seen in FIG. 1, there are provided, in this element, at the front face of the cartridge 10, at respective opposite sides of the adjusting screw 11, electrical contacts 12, 13. These electrical contacts are for engagement, as will be described, with an adjuster tool shown in FIG. 2. The number of electrical connections are minimised, for considerations of reliability, space-saving and cost, and thus preferably the metal cartridge body itself is used as one of the minimum three connections.

Electronic circuitry, shown generally at 15, is contained in the cartridge 10, and as will be described, this regulates and amplifies an output from an electronic position sensor, not shown, which senses the position of the cutting tool, in particular the adjusted position of the cutting edge thereof. Accordingly as the position of the cutting edge is adjusted, as will be described, an output from the electronic position sensor is regulated and amplified by the circuitry 15 so that a signal voltage output dependent upon the amount of adjustment of the cutting tool edge is made available at said electrical contact 13 of the cartridge 10 mentioned above. The relationship between the amount of adjustment and the signal voltage generated would generally be non-linear, but known, but it could be proportional, i.e. linear.

The adjuster tool 14 is of elongate form having at one end a rotatable handle 16. Extending from this handle is a longitudinally extending shaft 17, a free splined end of which extends out of the end of the adjuster tool 14 which is generally in the form of an anvil 18. The splined shaft 17 is adapted to engage with the adjusting screw 11, so that when the adjuster tool 14 is engaged with the cartridge 10, the end of the shaft 17 extending from the anvil 18 is received in operative engagement with the adjusting screw, and respective electrical contacts 19, 20 at respective opposite sides of the shaft 17 at the end of the anvil engage with the contacts 12, 13 respectively, so that the engagement of the adjuster tool with the cartridge 10 is both mechanical, by way of the shaft 17, and electrical/electronic, by way of the contacts 19, with the contacts 12, 13.

Further electronic circuitry, not shown, is located in the handle 16 of the adjuster tool, and this circuitry processes the signal voltage made available at the electrical output 13 of the cartridge 10 and thus transmitted to the circuitry in the handle 16. As a consequence the distance equivalent of the voltage is displayed on an LCD screen 21 carried on a body part of the adjuster tool between the handle 16 and the anvil 18. Power to the cartridge 10 is provided by way of batteries located in the handle 16. These batteries could be arranged to be rechargeable, either out of the handle, or in situ, and in alternative embodiments, any suitable alternative power source could be provided. It will be understood that these batteries or other power sources need not be provided in the handle, and could be provided in some other part of the adjuster tool 14. It will also be understood that the position of the LCD screen 21 could be different from that shown. Power is transmitted to the cartridge body at input contact 12 by way of contact 19, whilst the cartridge body itself conveniently acts as a common ground/earth for power the power input and signal output. However alternatively a third contact in the form of an earth may be provided at the body.

Accordingly with the adjustable cartridge 10 securely fixed to a boring bar or the like, the adjuster tool 14 is engaged with the cartridge 10 when adjustment of the cutting tool position is required. Once the electrical connections have been made between the contacts 12, 13 and contacts 19, 20, power from the batteries of the adjuster tool is transmitted to the cartridge 10, so that when the handle 16 is rotated clockwise or anticlockwise, as desired, the position of the cutting tool is adjusted, and this amount of adjustment is displayed on the LCD screen 21 so that the operator can clearly see in which direction, and by how much, adjustment is required to bring the cutting tool to the desired adjusted position.

Once the required adjustment has been made, the operator disengages the adjuster tool from the adjustable cartridge 10, breaking the electrical contact and thus switching it off. The LCD screen may show the final reading for a few seconds after contact has been broken, allowing the operator to double-check that the correct adjustment has been made. All the electronics then automatically switch off. The electronics module is preferably encapsulated within a machined pocket on the body of the cartridge 10 at the time of manufacture. The position voltage output for all adjustable cartridges 10 can be the same, this allowing the adjuster tool to be used for any similarly constructed cartridge.

It will be understood that although in this example the operator receives information via the LCD screen 21, information regarding the adjustment could be provided in a variety of different ways. Thus the signal voltage from the cartridge could be processed in the adjuster tool to provide a simulated voice output as to the distance equivalent of the voltage. In an alternative embodiment, the display screen of the adjuster tool could be provided with a scale having a zero as the initial position of the tool, manual adjustment being shown relative to the scale by way of an increasing or decreasing block or bar moving up or down or along the scale to indicate the degree of adjustment.

The adjuster tool 22 shown in FIG. 3 differs from the tool 14 shown in FIG. 2, in that the manual adjustment of the shaft 17 is here replaced with a motor-driven adjusting shaft 23. The body of the adjuster tool 22 at its end remote from the protruding shaft 23 is provided with a rocker switch 24, or equivalent, for rotating the shaft 23 clockwise or anticlockwise, in order to adjust the edge of the cutting tool in one direction or the other. This design would allow a more robust connection to be made with the cartridge 10. All the other aspects of the adjuster tool would be the same as for the tool 14 described in relation to FIG. 2, in that the body in which the switch is provided would include therein batteries and electronic circuitry, with the LCD screen operating in the same manner as described previously in relation to FIG. 2. Clearly here, however, the 'handle' part of the tool would not be rotatable as with the handle 16 of the FIG. 2 embodiment.

FIG. 4 shows a further embodiment of an adjuster tool of the invention, the adjuster tool 25 shown in FIG. 4, like the adjuster tool 22 of FIG. 3, having no rotating adjustment handle. Here the adjuster tool 25 has a small keypad 26 incorporated into the fixed handle part 27 thereof, together with a smaller LCD screen 28 in said handle part. As previously, the handle part incorporates power, for example batteries, and also electronic circuitry. The opposite end of the adjuster tool is the same as for the tools shown in FIGS. 2 and 3, in having a shaft 29 and electrical contacts 30, 31. Like the FIG. 3 embodiment, a motor is provided in the handle part 27 to turn the shaft 29. Accordingly an operator uses the keypad to program the required adjustment. In this regard the keypad incorporates UP and DOWN pads which allow the operator to pre-program in the required adjustment of the cutting tool edge in one direction or the other, the LCD screen showing digitally the selected amount of adjustment and in which direction (+ or −). The keypad also incorporates an on/off pad and an 'OK' pad for locking the pre-programmed adjustment amount when this is correct. When the adjuster tool is engaged with the cartridge 10 by way of the shaft 29 and the contacts 30, 31 with the screw 11 and contacts 12, 13 respectively, the pre-programmed adjustment is carried out automatically, with some form of motor or the like operating to turn the shaft 29.

In an alternative form of the adjuster tool 25, the adjustment is effected manually rather than by means of a motor, or some other automatic means. Accordingly the alternative form of adjuster tool to that shown in FIG. 4 would incorporate a rotatable handle or the like, such as the handle 16 shown in FIG. 2, for turning the shaft 29. This alternative form of adjuster tool 25 would still incorporate a key pad for pre-programming the desired amount of adjustment, this being shown at an LCD screen equivalent to that shown at 28 in FIG. 4. In order to inform the operator when the correct amount of pre-programmed adjustment has been effected, i.e. the handle has been turned sufficiently, any suitable means could be provided. Preferably a series of coloured LED's 40 are placed at the end of the adjuster tool, and these could either (all) light up, or (all) extinguish to indicate when the correct degree of pre-programmed adjustment has taken place. Alternatively some other means of conveying this information to the operator could be provided, for example voice simulation, or a simplified graphical representation at the LCD screen, as mentioned above for the first embodiment. Additionally here, some form of note could be provided which alters in tone or pitch as the correct degree of turning of the shaft 29, i.e. that shown on the LCD screen 28, is reached.

A still further embodiment of the invention is shown in FIGS. 5 and 6, where rather than combining the part of the tool having the LCD readout thereon with the mechanical adjustment tool, the mechanical and electronic functions could be split so that the mechanical adjustment tool 32 is wholly separate from the read-out part 33 which, when combined together, as for example in FIG. 2, form a composite adjuster tool. The read-out part 33 incorporates electrical contacts 34, 35 respectively for engagement with the contact 12, 13 of the cartridge 10, this part 33 also having an LCD screen 36 to receive the digital adjustment reading from the cartridge 10 as the cutting tool edge position is adjusted. Again circuitry and power providing means would be located in the body of the part 33. The tool 32 would have a handle 37 from which extends a shaft 38 with a splined end 39 for engaging with the adjusting screw 11 of the cartridge 10. However this arrangement would provide greater flexibility as to where the electrical contacts 12, 13 are placed on the cartridge 10, given that their position is no longer dictated by the positions, in a composite unit, of the electrical contacts 34, 35 of the read-out part 33 and the splined end 39 of the mechanical adjustment tool 32. read-out part 33 and the splined end 39 of the mechanical adjustment tool 32. For example, it would thus now be possible for the read-out part 33 to be engaged at one side of the cartridge, rather than at the front thereof, with the tool 32 still being engaged at the adjusting screw 11 at the front of the cartridge 10. All other operations and arrangements of the adjustment system would be the same as for the previous embodiments described in relation to the signal voltage from the cartridge being proportional to the amount of adjustment of the cutting tool edge, this signal being processed by electronic circuitry in the part 33 having the LCD screen 36.

In a still further embodiment, a small low-power radio transmitter could be incorporated either into the encapsulated electronics in the adjustable cartridge 10 or into the mechanical adjusting tool. The digital equivalent of the sensor voltage would be transmitted to a nearby display module incorporating a (radio) receiver and a large LCD or other display. The display module could be a battery-powered, hand-held device, or a larger device could be attached to a convenient nearby surface so as to be easily viewed by an operator. The larger device LCD would probably be mains powered, be as large as a PC monitor screen, and may even be viewable by the operators of several machining centres. The mechanical adjusting tool would supply raw (battery) power to electronics as previously described, for the duration of the adjustment procedure.

Whilst the invention has been referred to in relation to a cartridge, it will be understood that it is equally applicable to a bush unit. Moreover although described with a boring bar, the invention could be applied to a reaming tool. In particular two sensors and adjustment mechanisms could be incorporated into a reaming tool with a replaceable blade, in order to set both the cut diameter and back taper.

Instead of a numerical output at the LCD, a graphical representation of the blade's position could be provided at the LCD. This would also allow the tool to be adjusted within the machine.

The invention claimed is:

1. A cutting tool adjustment system comprising a body for adjustably holding a metal cutting tool, a metal cutting tool held in the body, and an adjuster tool, the adjuster tool comprising: adjustment means mechanically releasably engageable with the body for positionally adjusting a cutting edge of the cutting tool, and means electronically releasably engageable with the body and including power supply means for at least powering means providing information as to adjustment made, in use, to said cutting edge position by said adjustment means; wherein the adjuster tool is engaged with the body for adjusting a cutting edge of the metal cutting tool and is disengaged when the cutting tool is used for cutting.

2. The system as claimed in claim 1, wherein the means providing information as to the adjustment made to the cutting tool edge position is a visual display.

3. The system as claimed in claim 2, wherein the visual display is an electronic display.

4. The system as claimed in claim 3 wherein the visual display is part of the means electronically releasably engageable with the body.

5. The system as claimed in claim 4, wherein the visual display shows the adjustment as the adjustment means is operated.

6. The system as claimed in claim 4, wherein the visual display shows a pre-programmed amount of adjustment.

7. The system as claimed in claim 6, wherein the adjustment means is motor driven and the pre-programmed amount of adjustment is effected automatically upon engagement of the electronically engageable means with the body.

8. The system as claimed in claim 7, wherein the adjustment means is fitted to the means electronically engageable with the body to define an adjuster tool which has a rocker switch for 'up/down' adjustment of the cutting tool edge.

9. The system as claimed in claim 6, wherein the adjustment means is manually operated and at least one LED turns on or off to indicate when said pre-programmed amount of adjustment has been effected.

10. The system as claimed in claim 2, wherein the visual display is an LCD.

11. The system as claimed in claim 2, wherein the display is provided with a scale, adjustment of the cutting edge position being shown by way of an increasing or decreasing bar.

12. The system as claimed in claim 11, wherein the visual display is an LCD screen.

13. The system as claimed in claim 2, wherein the visual display is part of a display module, spaced from the adjustment means and the means engageable with the body, and incorporating a receiver for a signal transmitted from the body or the means engageable therewith.

14. The system as claimed in claim 13, wherein the display module is a hand-held, battery-powered device.

15. The system claimed in claim 1, wherein the means providing information as to the adjustment made to the cutting edge position is a simulated voice output.

16. The system as claimed in claim 1, wherein the adjuster tool is engaged with the body, operation of said adjustment means turns an adjusting screw controlling the position of the cutting edge.

17. The system as claimed in claim 1, wherein when the adjuster tool is engaged with the body, there is at least one electrical contact therebetween.

18. The system as claimed in claim 17, wherein the adjuster tool includes power supply means which by way of said at least one electrical contact supplies power to the body.

19. The system as claimed in claim 18, wherein the power supply is provided by a battery.

20. The system as claimed in claim 19, wherein said battery is rechargeable.

21. The system as claimed in claim 18, wherein the body contains electronic circuitry which generates a signal voltage dependent upon the amount of adjustment of the cutting tool edge.

22. The system as claimed in claim 21, wherein the relationship between the amount of adjustment of the cutting tool edge and the signal voltage generated is non-linear.

23. The system as claimed in claim 21, wherein said electronic circuitry regulates and applies an output from an electronic position sensor monitoring the position of said cutting tool edge.

24. The system as claimed in claim 21, wherein the power from the adjuster tool is passed via one electrical input contact to the electronic circuitry on the body, whilst said output signal voltage is made available at a second electrical contact between the body and the adjuster tool.

25. The system as claimed in claim 24, wherein the body acts as a common ground/earth connection.

26. The system as claimed in claim 21, wherein the signal voltage is processed by an electronic circuit located in the adjuster tool.

27. The system as claimed in claim 26, wherein the electronic circuit is in a handle of the adjustment means.

28. The system as claimed in claim 1, wherein the adjustment means is separate from the means electronically engageable with the body and is not fitted thereto, in use.

29. The system as claimed in claim 28, wherein the means electronically engageable with the body contains power supply means and electrical contact means for engagement with electrical contact means of the body, as well as visual display means.

30. The system as claimed in claim 29, wherein the body has said electrical contact means spaced from internal adjustment screw means for receiving an interengaging adjusting part of the adjustment means.

31. The system as claimed in claim 1, in which the body is a cartridge.

32. The system as claimed in claim 31, wherein the cartridge is mountable on a boring bar.

33. The system as claimed in claim 31, wherein the cartridge is mountable on a reaming tool.

34. The system as claimed in claim 1, wherein the body is a bush unit.

* * * * *